United States Patent [19]

Hefner

[11] 4,380,245
[45] Apr. 19, 1983

[54] ANTIFREEZE COVER ASSEMBLY FOR EXTERNAL FAUCETS

[76] Inventor: Irving V. Hefner, 1429 Huron Ave., New Orleans, La. 70005

[21] Appl. No.: 228,629

[22] Filed: Jan. 26, 1981

[51] Int. Cl.$^3$ .............................................. F16K 49/00
[52] U.S. Cl. ..................................... 137/375; 137/382; 137/800
[58] Field of Search ...................... 137/375, 382, 800; 24/116 A; 150/2.2

[56] References Cited

U.S. PATENT DOCUMENTS

| 2,225,764 | 12/1940 | Beal | 150/2.2 |
| 2,355,836 | 8/1944 | Willey | 24/116 A UX |
| 2,686,530 | 8/1954 | Dire | 137/375 |
| 2,932,313 | 4/1960 | Noland | 137/301 X |
| 4,103,701 | 8/1978 | Jeng | 137/375 |
| 4,244,394 | 1/1981 | Hartselle | 137/375 |

Primary Examiner—Gerald A. Michalsky
Attorney, Agent, or Firm—Charles C. Garvey

[57] ABSTRACT

A covering for exterior water faucets provides a cover assembly which is secured to the side of a home, for example, encapsulating the exposed water faucet with means being provided for securing the cover about the faucet, the means including a cap having internal threads for threadably attaching it to the external threads of the faucet with a cable being secured at one end to the cap and penetrating a provided opening in the cover wall. At the opposite end portion from the cap, the cable is secured to the cover wall with tensile force being utilized to anchor the cover assembly about the faucet. In the preferred embodiment the cable includes a ball chain and a plastic lock is provided for anchoring the cover to the ball chain by occupying a position between successive ball portions of the chain.

4 Claims, 4 Drawing Figures

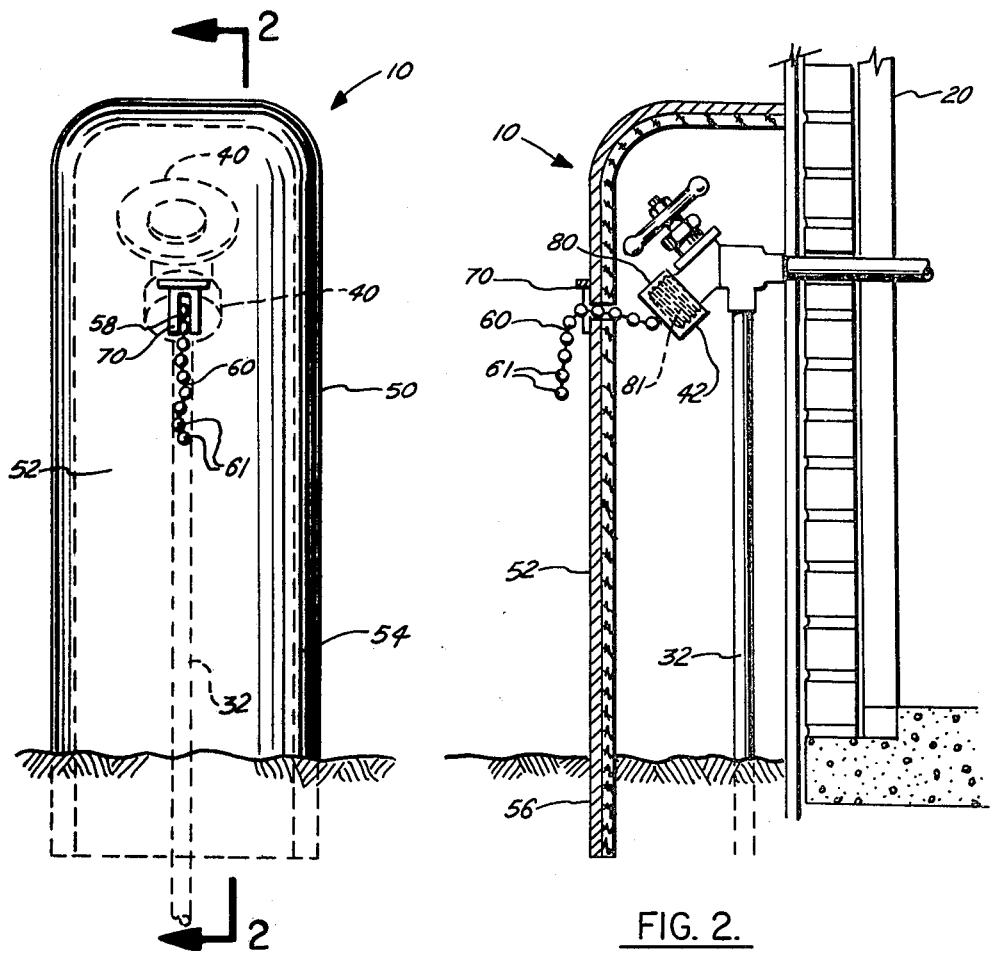
FIG. 1.
FIG. 2.
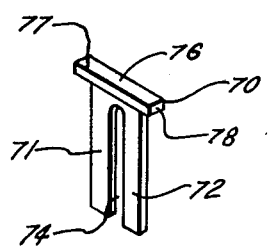
FIG. 4.
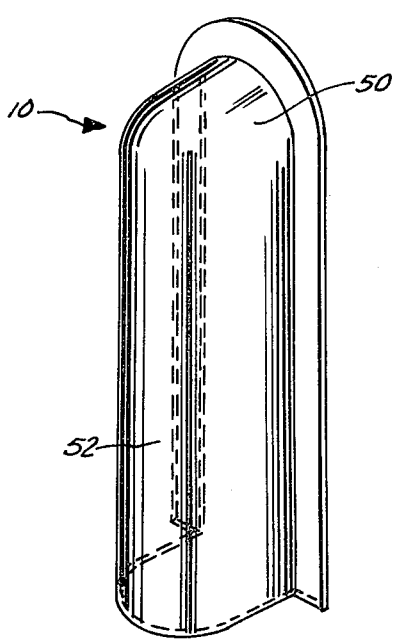
FIG. 3.

ANTIFREEZE COVER ASSEMBLY FOR EXTERNAL FAUCETS

BACKGROUND OF THE INVENTION

1. Field of the Invention

The present invention relates to antifreeze covers for exterior water faucets and the like and more particularly relates to a cover assembly which anchors the assembly to the threaded portion of the faucet.

2. General Background

In the protection of exterior water faucets, it has been known to coat the faucet with any number of insulating materials in order to prevent freezing of water pipes. People in the past have used wrappings of newspaper or cloth or alternatively have employed heat from the exterior such as a blow torch or the like to melt water which had become frozen inside the pipe.

Several devices have been patented which have attempted to solve the problem of protecting exterior faucets on homes and the like. Of those prior art patents, the following is a listing of those known to applicant each of which is hereby incorporated by reference:

| PATENT NO. | INVENTOR | ISSUE DATE |
| --- | --- | --- |
| 4,142,565 | H. Plunkett, Sr. | Mar. 6, 1979 |
| 4,103,701 | Duen-Ren Jeng | Aug. 1, 1978 |
| 4,071,043 | Cleo D. Carlson | Jan. 31, 1978 |
| 3,858,632 | Bob Stout | Jan. 7, 1975 |
| 2,985,552 | S. L. Watanabe | May 23, 1961 |
| 2,932,313 | W. B. Noland | April 12, 1960 |
| 2,686,530 | F. Dire | Aug. 17, 1954 |
| 2,650,180 | S. F. Walker | Aug. 25, 1953 |

SUMMARY OF INVENTION

The present invention solves the prior art problems and shortcomings by providing an encapsulating cover which envelopes the exterior faucet and is secured thereto by means of a cap which has internal threads which threadably attach the cap to the external threads of a conventional water faucet. A flexible cable in the form of, for example, a ball chain is attached at one end portion to the cap and at the other end portion penetrates the cover wall and is locked and anchored thereto, for example, by a provided lock mechanism which attaches to the ball chain to the cover.

The external cover could be, for example, of plastic or like material having internal insulation and an external gasket of rubber or like pliable material which would be provided as an interface between the cover and the home exterior or the like.

It is an object of the present invention to provide an antifreeze cover assembly apparatus for preventing freezing of external faucets during freezing conditions;

it is further the object of the present invention to provide an apparatus for easy insertion and removal in the protection of external water faucets;

it is still a further object of the present invention to provide an apparatus which serves as an encapsulating cover for external water faucets and the like exposed pipes.

BRIEF DESCRIPTION OF THE DRAWINGS

FIG. 1 is a sectional elevational view of the preferred embodiment of the apparatus of the present invention;

FIG. 2 is a sectional view taken along lines 2—2 of FIG. 1;

FIG. 3 is a top view of the preferred embodiment of the apparatus of the present invention; and FIG. 4 is a perspective view of the clip portion of the preferred embodiment of the apparatus of the present invention.

DETAILED DESCRIPTION OF THE PREFERRED EMBODIMENT

FIGS. 1-3 best show the preferred embodiment of the apparatus of the present invention designated generally by the numeral 10.

In FIG. 1 there can be seen the outside wall 20 portion of a conventional home, for example, with cover 50 being shown attached thereto and encapsulating an exterior faucet 40. Faucet 40 provides external threads 42 which as will be described more fully hereinafter provide the point for anchoring attachment of cover assembly 10 thereto.

An encapsulating cover 50 is provided being formed, for example, of plastic or the like. Cover 50 comprises a back flange portion 54 which is generally U-shaped in the preferred embodiment and is attached to a projecting U-shaped portion designated generally by the numeral 52. As shown in FIG. 2, cover 50 could be dome shaped extending from a portion of wall 20 somewhat above the faucet at point 60 and terminating below the groundlevel at point 56 thereby encapsulating the entire faucet 40 in the downwardly extending pipe 32 portion of faucet 40. Therefore, the cover 50 as shown in FIGS. 1 and 2 would provide complete encapsulating cover between the wall and the earth, thus preventing exposure of the faucet to the outside air.

A plastic cap 80 would be provided with internal threads 81 which could be of the thread pattern equal to or identical to the external thread pattern of faucet 40. Thus a threaded connection could be formed between external threads of faucet 40 and internal threads of plastic cap 80. Attached to cap 80 is chain 60 which would be, for example, a ball chain or the like. Ball chain 60, comprising individual connected balls 61 of uniform diameter, would pass during operation through a provided opening 58 of cover 50 with plastic lock 70 connecting to chain 60 external to cover 50. Lock 70 would be, for example, a bifurcated lock having a pair of spaced apart parallel locking tabs 71, 72 with a recess 74 being provided therebetween. In operation, recess 74 would occupy a position between two adjacent ball portions of ball chain 60, and be of a spacing thickness (defined by the distance between tabs 71, 72) less than the diameter of each ball 61 of ball chain 60. A gripping top 76 provided on lock 70 allows easy manipulation using for example the thumb and forefinger placed respectively at edges 77, 78.

I claim:

1. An antifreeze cover assembly for protecting external water faucet and riser pipe assemblies adjacent building walls comprising:

a. a cover, said cover providing an internal space normally occupied during operation by an exterior faucet and a riser pipe on a home, said cover providing a back flange portion which during operation contacts the flat wall surface of the building, and a lowermost portion which communicates with the earth and continuously covering the riser pipe;

b. a cap member having internal threads and being connectable during operation to the external threads of the faucet to be protected;
c. a connector affixed at one end portion to said cap, said connector extending to said cover removably attaching thereto, securing said cover to the building wall; and
d. detachable locking means carried by said cover for removably securing said connector to said cover.

2. The cover assembly of claim 1, wherein said connector comprises at least in part an elongated chain.

3. The cover assembly of claim 1, wherein said locking means is a clamp affixable to said connector at said cover.

4. The cover assembly of claim 1, wherein said connector is a ball chain, and said locking means comprises a clamp insertable at least in part between adjacent provided ball portions of said ball chain.